United States Patent
Nakatsuka et al.

(10) Patent No.: US 6,939,901 B2
(45) Date of Patent: Sep. 6, 2005

(54) ADHESIVE COMPOSITION

(75) Inventors: Kazumitsu Nakatsuka, Kurashiki (JP); Koichi Okada, Kurashiki (JP)

(73) Assignee: Kuraray Medical, Inc., Kurashiki (JP)

( * ) Notice: Subject to any disclaimer, the term of this patent is extended or adjusted under 35 U.S.C. 154(b) by 424 days.

(21) Appl. No.: 10/151,927

(22) Filed: May 22, 2002

(65) Prior Publication Data

US 2002/0198284 A1 Dec. 26, 2002

Related U.S. Application Data

(63) Continuation-in-part of application No. PCT/JP00/08075, filed on Nov. 16, 2000.

(30) Foreign Application Priority Data

| Nov. 22, 1999 | (JP) | ............................................. 11-331104 |
| Feb. 7, 2000 | (JP) | ....................................... 2000-028746 |

(51) Int. Cl.⁷ .......................... A61K 6/08; C08F 230/02; C08F 2/46
(52) U.S. Cl. ....................... 523/118; 523/120; 522/171; 522/180; 522/183; 526/277; 526/292.1
(58) Field of Search ................................ 523/118, 120; 522/171, 180, 183; 526/277, 292.1

(56) References Cited

U.S. PATENT DOCUMENTS

| 4,243,578 A | * | 1/1981 | O'Sullivan et al. ......... 523/116 |
| 4,650,847 A | | 3/1987 | Omura et al. |
| 4,985,516 A | | 1/1991 | Sakashita et al. |
| 5,122,061 A | | 6/1992 | Wakumoto et al. |
| 5,530,038 A | | 6/1996 | Yamamoto et al. |
| 5,587,406 A | | 12/1996 | Yamamoto et al. |
| 5,834,532 A | | 11/1998 | Yamamoto et al. |
| 6,071,983 A | | 6/2000 | Yamamoto et al. |
| 6,217,644 B1 | * | 4/2001 | Matsunae et al. ............. 106/35 |
| 6,512,068 B1 | | 1/2003 | Nakatsuka |

FOREIGN PATENT DOCUMENTS

| EP | 266220 | 5/1988 |
| EP | 282280 | 9/1988 |
| JP | 51-48596 | 4/1976 |
| JP | 52-113089 | 9/1977 |
| JP | 53-67740 | 6/1978 |
| JP | 53-69494 | 6/1978 |
| JP | 53-144939 | 12/1978 |
| JP | 58-21607 | 2/1983 |
| JP | 58-128393 | 7/1983 |
| JP | 58-192891 | 11/1983 |
| JP | 59-15468 | 1/1984 |
| JP | 61-176506 | 8/1986 |
| JP | 62-223289 | 10/1987 |
| JP | 62-281885 | 12/1987 |
| JP | 63-162710 | 7/1988 |
| JP | 63-221181 | 9/1988 |
| JP | 64-90277 | 4/1989 |
| JP | 2-117906 | 5/1990 |
| JP | 3-240712 | 10/1991 |
| JP | 4-154708 | 5/1992 |
| JP | 5-4942 | 1/1993 |
| JP | 7-97306 | 4/1995 |

OTHER PUBLICATIONS

Derwent Reference No. JP63111861/pn (Computer Generated English Abstract).
Derwent Reference No. JP63111862/pn (Computer Generated English Abstract).

* cited by examiner

*Primary Examiner*—Tae H. Yoon
(74) *Attorney, Agent, or Firm*—Oblon, Spivak, McClelland, Maier & Neustadt, P.C.

(57) ABSTRACT

An adhesive composition comprising (a) an acidic group-containing polymerizable monomer; (b) a polymerizable monomer represented by the general formula (I):

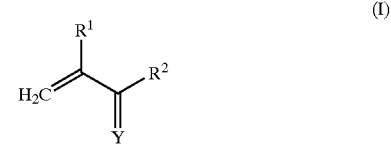

wherein $R^1$ is hydrogen atom or methyl group; $R^2$ is a halogen atom, hydroxyl group, mercapto group or —O—$R^3$—OH group, wherein $R^3$ is an alkylene group having 6 to 25 carbon atoms; and Y is oxygen atom or sulfur atom; and (c) a hydrophilic polymerizable monomer, wherein the weight ratio of the polymerizable monomer (b)/acidic group-containing polymerizable monomer (a) is 0.001 to 0.5. The adhesive composition of the present invention can be suitably used for bonding a hard tissue with a resin material in the medical field and the dental field.

20 Claims, No Drawings

ADHESIVE COMPOSITION

This application is a continuation-in-part application of PCT/JP00/08075, filed date Nov. 16, 2000 the entire contents of which are incorporated herein by reference.

BACKGROUND OF THE INVENTION

1. Field of the Invention

The present invention relates to an adhesive composition for hard tissues used in the medical and dental fields, showing strong adhesion to hard tissues such as bone, nail and tooth, and being excellent in peripherical sealability. More specifically, the present invention relates to a dental adhesive composition which is usually used for bonding to a tooth a resin material such as a dental bonding material, a dental luting material, a dental composite resin or a dental compomer, especially for the purpose of giving tooth excellent peripherical sealability in odontotherapy.

2. Discussion of the Related Art

In the restoration of teeth damaged by caries or the like, there have been used a filling restorative material which is a so-called filling composite resin or filling compomer, a crown restorative material such as a dental metal alloy, porcelain or a resin material, and the like. However, since these filling restorative materials and crown restorative materials themselves do not exhibit adhesive properties, conventionally various dental adhesives have been used. Among them, there has been preferably employed a so-called acidic etching-type adhesive system in which a tooth surface is treated with a strong acidic etching agent such as phosphoric acid, and thereafter a bonding material is applied thereto for adhesion.

However, there are some defects in the above method of treating with the acidic etching agent, such that washing with water for sufficiently removing the acid and drying again are necessitated after the treatment. Therefore, there is a defect that its procedures are complicated. According to the adhesive system using an acidic etching agent, adhesive properties for enamel would be improved. However, it is difficult to give dentin high adhesive strength and excellent peripherical sealability.

The term "peripherical sealability" as referred to herein means sealing ability of an adhesive at the bonding portion (peripherical portion). The peripherical sealability can be evaluated by immersing a sample in a solution of a colorant, for instance, an aqueous basic fuchsine solution. When the clearance of the bonding portion between a tooth and an adhesive is large, a large amount of the colorant penetrates into the clearance, so that the adherent is remarkably colored at the peripherical portion. When the adherent is colored as described above, it is thought that the clearance gives one of causations for secondary caries by the invasion of bacteria or foreign substances giving a harmful effect on adhesive properties into the clearance.

As techniques using other adhesives, there have been proposed in Japanese Patent Laid-Open Nos. Sho 62-223289 and Hei 3-240712 an adhesive system in which a tooth is treated with a primer composition composed of an acid or acidic monomer in place of the acidic etching agent, and a hydrophilic monomer, and thereafter a bonding material is applied to the tooth without the procedure of washing with water, i.e. a so-called adhesive system using a self-etching primer. In this adhesive system, adhesive properties and peripherical sealabilities have been improved to some extent especially for dentin.

However, in this adhesive system, the durability cannot be said to be enough even though the self-etching primer is used. Accordingly, there often occurs deterioration in peripherical sealability when the lowering of adhesive strength is small in the durability test of adhesive strength. Therefore, there are often caused some problems in clinics such that leakage is caused between the tooth and the restorative material after the passage of a given time period from restoration, and that caries again progresses from the peripherical portion, thereby generating a so-called secondary caries. Therefore, in recent years, there have been desired further improvements in sealability at the peripherical portion.

An object of the present invention is to provide an adhesive composition for hard tissues, which exhibits excellent adhesive properties for hard tissues, especially tooth such as enamel, dentin or cement, and which is especially excellent in peripherical sealability.

These and other objects of the present invention will be apparent from the following description.

SUMMARY OF THE INVENTION

The present invention relates to an adhesive composition comprising:

(a) at least one acidic group-containing polymerizable monomer selected from the group consisting of a phosphate group-containing polymerizable monomer, a pyrophosphate group-containing polymerizable monomer, a thiophosphate group-containing polymerizable monomer and a sulfonate group-containing polymerizable monomer;

(b) a polymerizable monomer represented by the general formula (I):

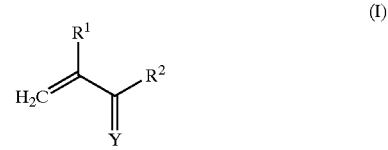

wherein $R^1$ is hydrogen atom or methyl group; $R^2$ is a halogen atom, hydroxyl group, mercapto group or —O—$R^3$—OH group, wherein $R^3$ is an alkylene group having 6 to 25 carbon atoms; and Y is oxygen atom or sulfur atom; and (c) at least one hydrophilic polymerizable monomer selected from the group consisting of hydroxyalkyl (meth)acrylates having an alkylene group of 2 or 3 carbon atoms; di-, tri- or tetra-hydroxy (meth)acrylates having an alkylene group of 3 to 5 carbon atoms; mono-, di- or tri-hydroxy di(meth)acrylates having an alkylene group of 3 to 5 carbon atoms; (meth) acryloyloxyalkyl trialkylammonium halides having an alkylene group of 2 to 20 carbon atoms; (meth) acrylamides; mono- or di(hydroxyalkyl) (meth) acrylates having 2 or 3 carbon atoms; and polyethylene glycol di(meth)acrylates having at least 9 oxyethylene groups, wherein the weight ratio of the polymerizable monomer (b)/acidic group-containing polymerizable monomer (a) is 0.001 to 0.5.

DETAILED DESCRIPTION OF THE INVENTION

The acidic group-containing polymerizable monomer (a) is a component for giving teeth excellent adhesive property.

It is preferable that the acidic group-containing polymerizable monomer (a) has at least one polymerizable unsaturated group selected from the group consisting of acryloyl group, methacryloyl group, vinyl group and vinylbenzyl group. Among them, acryloyl group or methacryloyl group is preferable. In the present specification, the term "(meth)acryl" collectively expresses both methacryl and acryl.

The acidic group of the acidic group-containing polymerizable monomer (a) includes at least one member selected from the group consisting of phosphate group, pyrophosphate group, thiophosphate group and sulfonate group.

Concrete examples of the acidic group-containing polymerizable monomer (a) include a phosphate group-containing polymerizable monomer, a pyrophosphate group-containing polymerizable monomer, a thiophosphate group-containing polymerizable monomer and a sulfonate group-containing polymerizable monomer.

Concrete examples of the phosphate group-containing polymerizable monomer include 6-(meth)acryloyloxyhexyl dihydrogen phosphate, 7-(meth)acryloyloxyheptyl dihydrogen phosphate, 8-(meth)acryloyloxyoctyl dihydrogen phosphate, 9-(meth)acryloyloxynonyl dihydrogen phosphate, 10-(meth)acryloyloxydecyl dihydrogen phosphate, 11-(meth)acryloyloxyundecyl dihydrogen phosphate, 12-(meth)acryloyloxydodecyl dihydrogen phosphate, 16-(meth)acryloyloxyhexadecyl dihydrogen phosphate, 20-(meth)acryloyloxyeicosyl dihydrogen phosphate, di(meth)acryloyloxyhexyl hydrogen phosphate, di(meth)acryloyloxyheptyl hydrogen phosphate, di(meth)acryloyloxyoctyl hydrogen phosphate, di(meth)acryloyloxynonyl hydrogen phosphate, di(meth)acryloyloxydecyl hydrogen phosphate, 6-(meth)acryloyloxyhexyl methylhydrogen phosphate, 6-(meth)acryloyloxyhexyl ethylhydrogen phosphate, 8-(meth)acryloyloxyoctyl methylhydrogen phosphate, 10-(meth)acryloyloxydecyl methylhydrogen phosphate, 10-(meth)acryloyloxydecyl ethylhydrogen phosphate, 10-(meth)acryloyloxydecyl phenylhydrogen phosphate, 1,3-di(meth)acryloyloxypropyl-2-dihydrogen phosphate, 2-(meth)acryloyloxyethyl phenylhydrogen phosphate, 2-(meth)acryloyloxyethyl 2'-bromoethylhydrogen phosphate, (meth)acryloyloxyethyl phenyl phosphonate, 2-(meth)acryloyloxyethyl hexylhydrogen phosphate, 2-(meth)acryloyloxyethyl octylhydrogen phosphate, 2-(meth)acryloyloxyethyl decylhydrogen phosphate, and the like; (5-methacryloxy)pentyl-3-phosphonopropionate, (6-methacryloxy)hexyl-3-phosphonopropionate, (10-methacryloxy)decyl-3-phosphonopropionate, (6-methacryloxy)hexyl-3-phosphonoacetate, (10-methacryloxy)decyl-3-phosphonoacetate, and the like described in Japanese Patent Laid-Open No. Hei 3-294286; 2-methacryloxyethyl (4-methoxyphenyl)hydrogen phosphate, 2-methacryloxypropyl (4-methoxyphenyl) hydrogen phosphate, and the like described in Japanese Patent Laid-Open No. Sho 62-281885; phosphate group-containing polymerizable monomers and their acid chlorides exemplified in Japanese Patent Laid-Open Nos. Sho 52-113089, Sho 53-67740, Sho 53-69494, Sho 53-144939, Sho 58-128393 and Sho 58-192891; and the like.

Concrete examples of the pyrophosphate group-containing polymerizable monomer include di[2-(meth)acryloyloxyethyl]pyrophosphate, di[4-(meth)acryloyloxybutyl]pyrophosphate, di[6-(meth)acryloyloxyhexyl]pyrophosphate, di[8-(meth)acryloyloxyoctyl]pyrophosphate, di[9-(meth)acryloyloxynonyl]pyrophosphate, di[10-(meth)acryloyloxydecyl]pyrophosphate, di[10-(meth)acryloyloxyundecyl]pyrophosphate, and their acid chlorides, and the like.

Concrete examples of the thiophosphate group-containing polymerizable monomer include 6-(meth)acryloyloxyhexyl dihydrogen dithiophosphate, 8-(meth)acryloyloxyoctyl dihydrogen dithiophosphate, 9-(meth)acryloyloxynonyl dihydrogen dithiophosphate, 10-(meth)acryloyloxydecyl dihydrogen dithiophosphate, and their acid chlorides, and the like.

Concrete examples of the sulfonate group-containing polymerizable monomer include 2-(meth)acrylamide-2-methylpropanesulfonic acid, styrenesulfonic acid, 2-sulfoethyl (meth)acrylate, 6-sulfohexyl (meth)acrylate, p-(meth)acryloyloxybenzenesulfonic acid, and the like.

Any of the acidic group-containing polymerizable monomers (a) can be used alone or in combination of at least two kinds.

Among the acidic group-containing polymerizable monomers (a), the phosphate group-containing polymerizable monomer, especially a phosphate group-containing polymerizable monomer represented by the general formula (II):

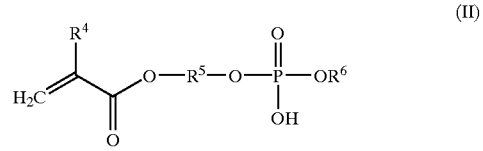

wherein $R^4$ is hydrogen atom or methyl group; $R^5$ is an alkylene group having 6 to 25 carbon atoms; and $R^6$ is hydrogen atom, an alkyl group or phenyl group, can be suitably used, because there are exhibited excellent adhesive property, adhesion durability, and peripherical sealability for enamel and dentin. It is desired that the number of carbon atoms of the alkyl group represented by $R^6$ is 1 to 20, preferably 1 to 10.

It is preferable that the content of the acidic group-containing polymerizable monomer (a) in the adhesive composition of the present invention is 1 to 70% by weight, preferably 5 to 60% by weight, more preferably 10 to 50% by weight, from the viewpoints of improvements in adhesive strength and peripherical sealability for teeth.

The polymerizable monomer (b) is a component capable of improving peripherical sealability. As the polymerizable monomer (b), there is used a polymerizable monomer represented by the general formula (I):

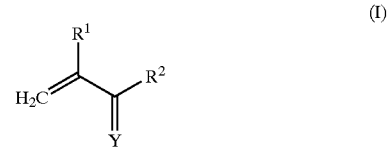

wherein $R^1$ is hydrogen atom or methyl group; $R^2$ is a halogen atom, hydroxyl group, mercapto group or —O—$R^3$—OH group, wherein $R^3$ is an alkylene group having 6 to 25 carbon atoms; and Y is oxygen atom or sulfur atom.

Representative examples of the polymerizable monomer represented by the general formula (I) include a hydroxyl group-containing polymerizable monomer represented by the general formula (III):

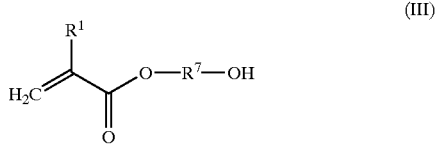

(III)

wherein R¹ is hydrogen atom or methyl group; and R⁷ is an alkylene group having 6 to 25 carbon atoms; and a polymerizable monomer represented by the general formula (IV):

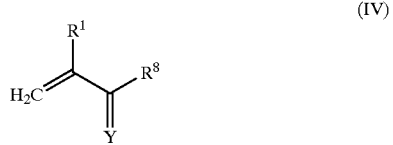

(IV)

wherein R¹ is hydrogen atom or methyl group; R⁸ is a halogen atom, hydroxyl group or mercapto group; and Y is oxygen atom or sulfur atom. These can be each used alone or in combination of at least two kinds.

Concrete examples of the hydroxyl group-containing polymerizable monomer represented by the general formula (III) include 6-hydroxyhexyl (meth)acrylate, 7-hydroxyheptyl (meth)acrylate, 8-hydroxyoctyl (meth)acrylate, 9-hydroxynonyl (meth)acrylate, 10-hydroxydecyl (meth)acrylate, 11-hydroxyundecyl (meth)acrylate, 12-hydroxydodecyl (meth)acrylate, 16-hydroxyhexadecyl (meth)acrylate, 20-hydroxyeicosyl (meth)acrylate, and the like. These can be used alone or in combination of at least two kinds. Among the hydroxyl group-containing polymerizable monomers represented by the general formula (III), 8-hydroxyoctyl (meth)acrylate, 10-hydroxydecyl (meth)acrylate, 12-hydroxydodecyl (meth)acrylate and 16-hydroxyhexadecyl (meth)acrylate can be suitably used.

Concrete examples of the polymerizable monomer represented by the general formula (IV) include (meth)acrylic acid, (meth)acrylic acid chloride, (meth)acrylic acid bromide, 2-methylpropenethionic acid, 2-methylpropenedithionic acid, propenethionic acid, propenedithionic acid, and the like. These can be used alone or in combination of at least two kinds. Among the polymerizable monomers represented by the general formula (IV), acrylic acid and methacrylic acid are preferable.

In the present invention, it is preferable that the hydroxyl group-containing polymerizable monomer represented by the general formula (III) is used together with the polymerizable monomer represented by the general formula (IV), from the viewpoint of improvement in peripherical sealability. In this case, it is preferable that the weight ratio of the hydroxyl group-containing polymerizable monomer represented by the general formula (III)/the polymerizable monomer represented by the general formula (IV) is 0.005 to 200, preferably 0.05 to 20, from the viewpoint of improvement in peripherical sealability.

In addition, it is preferable that the phosphate group-containing polymerizable monomer represented by the general formula (II) is used as the acidic group-containing polymerizable monomer (a), and that the hydroxyl group-containing polymerizable monomer represented by the general formula (III) is used as the polymerizable monomer (b), from the viewpoint of improvement in the peripherical sealability. In this case, it is preferable that the group R⁵ in the phosphate group-containing polymerizable monomer represented by the general formula (II) is identical to R⁷ in the hydroxyl group-containing polymerizable monomer represented by the general formula (III), from the viewpoint of further increasing the durability of peripherical sealability. In addition, it is preferable that the number of carbon atoms of the alkylene group of R⁷ in the hydroxyl group-containing polymerizable monomer represented by the general formula (III) is 8 to 25, from the viewpoints of further increasing the adhesion durability and the peripherical sealability.

In the present invention, the ratio of the acidic group-containing polymerizable monomer (a) to the polymerizable monomer (b) is important. The weight ratio of the polymerizable monomer (b)/the acidic group-containing polymerizable monomer (a) is adjusted to 0.001 to 0.5, preferably 0.005 to 0.3, more preferably 0.01 to 0.1, from the viewpoints of increasing the peripherical sealability and adhesive strength.

The hydrophilic polymerizable monomer (c) used in the present invention refers to a compound having a solubility of at least 10%, more preferably at least 30% in water of 25° C.

Concrete examples of the hydrophilic polymerizable monomer (c) include hydroxyalkyl (meth)acrylates having an alkylene group of 2 or 3 carbon atoms, such as 2-hydroxyethyl (meth)acrylate, 2-hydroxypropyl (meth) acrylate and 3-hydroxypropyl (meth)acrylate; di-, tri- or tetra-hydroxy (meth)acrylates having an alkylene group of 3 to 5 carbon atoms, such as 1,3-dihydroxypropyl (meth) acrylate, 2,3-dihydroxypropyl (meth)acrylate, 1,2,3-trihydroxybutyl (meth)acrylate and pentaerythritol mono (meth)acrylate; mono-, di- or tri-hydroxy di(meth)acrylates having an alkylene group of 3 to 5 carbon atoms, such as 2-hydroxypropyl-1,3-di(meth)acrylate, 3-hydroxypropyl-1, 2-di(meth)acrylate and 2,3-dihydroxybutyl-1,4-di(meth) acrylate; (meth)acryloyloxyalkyl trialkylammonium halides having an alkylene group of 2 to 20 carbon atoms, such as (meth)acryloyloxyethyl trimethylammonium chloride, (meth)acryloyloxyethyl triethylammonium chloride, (meth) acryloyloxybutyl trimethylammonium chloride, (meth) acryloyloxyhexyl trimethylammonium bromide, (meth) acryloyloxydecyl trimethylammonium chloride and (meth) acryloyloxyhexadecyl trimethylammonium chloride; (meth) acrylamides; mono- or di-(hydroxyalkyl) (meth)acrylates having 2 or 3 carbon atoms, such as 2-hydroxyethyl (meth) acrylamide, di(2-hydroxyethyl) (meth)acrylamide and 3-hydroxypropyl (meth)acrylamide; and polyethylene glycol di(meth)acrylates having at least 9 oxyethylene groups, such as polyethylene glycol di(meth)acrylate having 9 oxyethylene groups, polyethylene glycol di(meth)acrylate having 14 oxyethylene groups and polyethylene glycol di(meth) acrylate having 23 oxyethylene groups, and the like. These can be used alone or in combination of at least two kinds. Among the hydrophilic polymerizable monomers (c), a preference is given to hydrophilic polymerizable monomers of which alkylene group has 1 to 3 carbon atoms, from the viewpoint of improvement in penetrability to the teeth.

It is desired that the content of the hydrophilic polymerizable monomer (c) in the adhesive composition of the present invention is 5 to 95% by weight, preferably 10 to 90% by weight, more preferably 15 to 70% by weight, from the viewpoints of improvements in adhesive property and peripherical sealability.

The adhesive composition of the present invention may contain water (d) as occasion demands. When water (d) is contained in the adhesive composition, adhesive property and peripherical sealability for teeth can be improved.

Water (d) may be any of those which do not substantially contain impurities which give wrong influences to the exhibition of adhesive strength between the teeth and the restorative material. Water (d) is preferably distilled water or ion-exchanged water.

It is desired that the content of water (d) in the adhesive composition of the present invention is usually 0.1 to 80% by weight, preferably 0.5 to 70% by weight, more preferably 1 to 60% by weight, from the viewpoints of improvements in adhesive property and peripherical sealability for teeth.

In the present invention, when the adhesive composition is very thinly spread over the tooth surface with a dental air syringe or the like after the adhesive composition is applied to the tooth surface, the adhesive composition can be cured together with a dental bonding material, a dental luting material and a dental composite resin at the same time, so that a polymerization initiator is not necessarily required.

However, when the adhesive composition of the present invention is used in combination with a dental luting material comprising a redox chemical polymerization initiator, it is preferable that a reducing agent and/or an oxidizing agent is contained in the adhesive composition from the viewpoint of improvement in adhesive property.

In addition, when the adhesive composition of the present invention is coated in a thickness of at least 10 μm, it is preferable that a polymerization initiator (e) is contained in the adhesive composition.

As the polymerization initiator (e), there can be employed a known photopolymerization initiator and/or chemical polymerization initiator.

The photopolymerization initiator includes, for instance, α-diketones, ketals, thioxanthones, acylphosphine oxides, coumarines, halomethyl group-substituted-s-triazine derivatives, and the like.

Examples of the α-ketones include camphorquinone, benzyl, 2,3-pentadione, and the like.

Examples of the ketals include benzyl dimethyl ketal, benzyl diethyl ketal, and the like. Examples of the thioxanthones include 2-chlorothioxanthone, 2,4-diethylthioxanthone, and the like.

Examples of the acylphosphine oxides include, for instance, 2,4,6-trimethylbenzoyldiphenylphosphine oxide, 2,6-dimethoxybenzoyldiphenylphosphine oxide, 2,6-dichlorobenzoyldiphenylphosphine oxide, 2,3,5,6-tetramethylbenzoyldiphenylphosphine oxide, benzoyl di-(2,6-dimethylphenyl)phosphonate, 2,4,6-trimethylbenzoylethoxyphenylphosphine oxide, water-soluble acylphosphine oxide compounds disclosed in Japanese Examined Patent Publication No. Hei 3-57916, and the like.

Examples of the coumarines include compounds listed in Japanese Patent Laid-Open No. Hei 10-245525, such as 3,3'-carbonylbis(7-diethylamino)coumarine, 3-(4-methoxybenzoyl)coumarine, 3-thienoylcoumarine, and the like.

Examples of the halomethyl group-substituted-s-triazine derivatives include compounds listed in Japanese Patent Laid-Open No. Hei 10-245525, such as 2,4,6-tris (trichloromethyl)-s-triazine, 2,4,6-tris(tribromomethyl)-s-triazine and 2-methyl-4,6-bis(trichloromethyl)-s-triazine.

In addition, when the photopolymerization is carried out by ultraviolet ray irradiation, a benzoyl alkyl ether, a benzoyl dimethyl ketal or the like is preferable as a photopolymerization catalyst.

The photopolymerization initiator can be used alone or in combination of at least two kinds.

The content of the photopolymerization initiator in the adhesive composition of the present invention is not limited to specified ones. It is desired that the content is usually 0.01 to 10% by weight, preferably 0.1 to 5% by weight.

When the photopolymerization initiator is used as the polymerization initiator (e), the photopolymerization initiator may be used alone. However, in order to further accelerate photo-thermosetting properties, it is preferable that the photopolymerization initiator is used together with a reducing agent.

The reducing agent includes tertiary amines, aldehydes, thiol group-containing compounds, and the like.

Examples of the tertiary amines include 2-dimethylaminoethyl methacrylate, N,N-bis[(meth)acryloyloxyethyl]-N-methylamine, ethyl 4-dimethylaminobenzoate, butyl 4-dimethylaminobenzoate, butoxyethyl is 4-dimethylaminobenzoate, N-methyldiethanolamine, 4-dimethylaminobenzophenone, and the like.

Examples of the aldehydes include dimethylaminobenzaldehyde, terephthalaldehyde, and the like.

Examples of the thiol group-containing compounds include 2-mercaptobenzoxazole, decanethiol, 3-mercaptopropyltrimethoxysilane, thiobenzoic acid, and the like.

These reducing agents can be used alone or in combination of at least two kinds.

The content of the reducing agent in the adhesive composition of the present invention is not limited to specified ones. It is desired that the content is usually 0.01 to 10% by weight, preferably 0.05 to 7% by weight, more preferably 0.1 to 5% by weight.

In addition, as the chemical polymerization initiator, for instance, there can be suitably used a redox polymerization initiator comprising an oxidizing agent and a reducing agent.

When the redox polymerization initiator is used, there is a necessity to divide the adhesive composition into at least two wrapped portions. However, when the adhesive composition of the present invention is used together with the other material, for instance, a restorative material such as a dental bonding material, a composite resin, a compomer, a resin for denture base, a resin cement or a resin-reinforceable glass ionomer cement, it is possible to include only one of the oxidizing agent and the reducing agent in the adhesive composition, as long as at least one of the oxidizing agent and the reducing agent is contained in the restorative material.

The oxidizing agent includes, for instance, organic peroxides such as diacyl peroxides, peroxy esters, dialkyl peroxides, peroxy ketals, ketone peroxides and hydroperoxides.

Concrete examples of the diacyl peroxides include benzoyl peroxide, 2,4-dichlorobenzoyl peroxide, m-toluoyl peroxide, and the like.

Concrete examples of the peroxy esters include t-butylperoxy benzoate, bis-t-butylperoxy isophthalate, 2,5-dimethyl-2,5-bis(benzoylperoxy)hexane, t-butylperoxy-2-ethylhexanoate, t-butylperoxy isopropyl carbonate, and the like.

Concrete examples of the dialkyl peroxides include dicumyl peroxide, di-t-butyl peroxide, lauroyl peroxide, and the like.

Concrete examples of the peroxy ketals include 1,1-bis (t-butylperoxy)3,3,5-trimethylcyclohexane, 1,1-bis(t-butylperoxy)cyclohexane, 1,1-bis(t-hexylperoxy) cyclohexane, and the like.

Concrete examples of the ketone peroxides include methyl ethyl ketone peroxide, cyclohexanone peroxide, methyl acetoacetate peroxide, and the like.

Concrete examples of the hydroperoxides include t-butyl hydroperoxide, cumene hydroperoxide, p-diisopropylbenzene peroxide, and the like.

As the reducing agent, aromatic tertiary amines, aliphatic tertiary amines, sulfinic acids and their salts can be cited as preferred ones.

Concrete examples of the aromatic tertiary amines include N,N-dimethylaniline, N,N-dimethyl-p-toluidine, N,N-dimethyl-m-toluidine, N,N-diethyl-p-toluidine, N,N-dimethyl-3,5-dimethylaniline, N,N-dimethyl-3,4-dimethylaniline, N,N-dimethyl-4-ethylaniline, N,N-dimethyl-4-i-propylaniline, N,N-dimethyl-4-t-butylaniline, N,N-dimethyl-3,5-di-t-butylaniline, N,N-bis(2-hydroxyethyl)-3,5-dimethylaniline, N,N-di(2-hydroxyethyl)-p-toluidine, N,N-bis(2-hydroxyethyl)-3,4-dimethylaniline, N,N-bis(2-hydroxyethyl)-4-ethylaniline, N,N-bis(2-hydroxyethyl)-4-i-propylaniline, N,N-bis(2-hydroxyethyl)-4-t-butylaniline, N,N-bis(2-hydroxyethyl)-3,5-di-i-propylaniline, N,N-bis(2-hydroxyethyl)-3,5-di-t-butylaniline, n-butoxyethyl 4-dimethylaminobenzoate, (2-methacryloyloxy)ethyl 4-dimethylaminobenzoate, and the like.

Concrete examples of the aliphatic tertiary amines include trimethylamine, triethylamine, N-methyldiethanolamine, N-ethyldiethanolamine, N-n-butyldiethanolamine, N-lauryldiethanolamine, triethanolamine, (2-dimethylamino)ethyl methacrylate, N-methyldiethanolamine dimethacrylate, N-ethyldiethanolamine dimethacrylate, triethanolamine monomethacrylate, triethanolamine dimethacrylate, triethanolamine trimethacrylate, and the like.

Concrete examples of the sulfinic acids or their salts include benzenesulfinic acid, sodium benzenesulfinate, potassium benzenesulfinate, calcium benzenesulfinate, lithium benzenesulfinate, toluenesulfinic acid, sodium toluenesulfinate, potassium toluenesulfinate, calcium toluenesulfinate, lithium toluenesulfinate, 2,4,6-trimethylbenzenesulfinic acid, sodium 2,4,6-trimethylbenzenesulfinate, potassium 2,4,6-trimethylbenzenesulfinate, calcium 2,4,6-trimethylbenzenesulfinate, lithium 2,4,6-trimethylbenzenesulfinate, 2,4,6-triethylbenzenesulfinic acid, sodium 2,4,6-triethylbenzenesulfinate, potassium 2,4,6-triethylbenzenesulfinate, calcium 2,4,6-triethylbenzenesulfinate, 2,4,6-triisopropylbenzenesulfinic acid, sodium 2,4,6-triisopropylbenzenesulfinate, potassium 2,4,6-triisopropylbenzenesulfinate, calcium 2,4,6-triisopropylbenzenesulfinate, and the like.

These oxidizing agents and reducing agents can be used alone or in combination of at least two kinds.

The content of the chemical polymerization initiator in the adhesive composition of the present invention is not limited to specified ones. It is desired that the content is usually 0.01 to 10% by weight, preferably 0.05 to 7% by weight, more preferably 0.1 to 5% by weight.

For the purpose of improvements in thermosetting property and mechanical strength, there may be contained in the adhesive composition of the present invention a hydrophobic polymerizable monomer other than the acidic group-containing polymerizable monomer (a), the polymerizable monomer (b) and the hydrophilic polymerizable monomer (c) (hereinafter simply referred to as "hydrophobic polymerizable monomer").

The hydrophobic polymerizable monomer includes, for instance, esters of carboxylic acids such as α-cyanoacrylic acid, (meth)acrylic acid, α-halogenated acrylic acids, crotonic acid, cinnamic acid, sorbic acid, maleic acid and itaconic acid; derivatives of (meth)acrylamide; vinyl esters; vinyl ethers; mono-N-vinyl derivatives, styrene derivatives, and the like. Among them, (meth)acrylic acid esters are preferably used.

Concrete examples of the hydrophobic polymerizable monomer include the following monomers. The term "monofunctional monomer" as referred to herein means a monomer having one olefinic double bond.

(A) Monofunctional Monomer

Methyl (meth)acrylate, ethyl (meth)acrylate, 1-propyl (meth)acrylate, i-butyl (meth)acrylate, benzyl (meth)acrylate, lauryl (meth)acrylate, 2,3-dibromopropyl (meth)acrylate, 3-methacryloyloxypropyl trimethoxysilane, 11-methacryloyloxyundecyl trimethoxysilane, and the like.

(B) Bifunctional Monomer

Ethylene glycol di(meth)acrylate, triethylene glycol di(meth)acrylate, propylene glycol di(meth)acrylate, neopentyl glycol di(meth)acrylate, 1,6-hexanediol di(meth)acrylate, 1,10-decanediol di(meth)acrylate, bisphenol A diglycidyl di(meth)acrylate, 2,2-bis[4-(meth)acryloyloxyethoxyphenyl]propane, 2,2-bis[4-(meth)acryloyloxypolyethoxyphenyl]propane, 2,2-bis[4-[3-(meth)acryloyloxy-2-hydroxypropoxy]phenyl]propane, 1,2-bis[3-(meth)acryloyloxy-2-hydroxypropoxy]ethane, pentaerythritol di(meth)acrylate, 1,2-bis(3-methacryloyloxy-2-hydroxypropoxy)ethane, [2,2,4-trimethylhexamethylenebis(2-carbamoyloxyethyl)]dimethacrylate, and the like.

(C) Monomers Having Tri- or More Functional Group

Trimethylolpropane tri(meth)acrylate, trimethylolethane tri(meth)acrylate, tetramethylolmethane tri(meth)acrylate, pentaerythritol tetra(meth)acrylate, N,N'-(2,2,4-trimethylhexamethylene)bis[2-(aminocarboxy)propane-1,3-diol]tetramethacrylate, 1,7-diacryloyloxy-2,2,6,6,-tetraacryloyloxymethyl-4-oxyheptane, and the like.

The above-mentioned hydrophobic polymerizable monomers can be used alone or in combination of at least two kinds.

It is desired that the content of the hydrophobic polymerizable monomer in the adhesive composition of the present invention is usually at most 60% by weight, preferably at most 40% by weight, especially from the viewpoint of maintaining adhesive strength against enamel.

In addition, in the present invention, in order to supplement the solubility of the acidic group-containing polymerizable monomer (a), the polymerizable monomer (b) and the polymerization initiator in the adhesive composition, a volatile organic solvent can be contained in the adhesive composition.

As the volatile organic solvent, it is desired to use a volatile organic solvent usually having a boiling point of at most 150° C., preferably at most 100° C. at atmospheric pressure.

Preferred examples of the volatile organic solvent include alcohols such as ethanol, methanol, 1-propananol and isopropananol; ketones such as acetone and methyl ethyl ketone; ester compounds such as ethyl acetate, methyl acetate and ethyl propionate; ethers such as 1,2-dimethoxyethane, 1,2-diethoxyethane and tetrahydrofuran; hydrocarbon compounds such as heptane, hexane and toluene; halogenated hydrocarbon compounds such as chloroform and dichloromethane; and the like. These volatile organic solvents may be used alone or in combination of at least two kinds. Among them, a water-soluble volatile solvent such as ethanol or acetone is preferable.

The content of the volatile organic solvent in the adhesive composition of the present invention is not limited to specified ones. It is desired that the content is usually at most 60% by weight, preferably at most 30% by weight.

When the volatile organic solvent is contained in the adhesive composition, in order not to impair its adhesive property, it is preferable that the volatile solvent is evaporated as much as possible with a dental air syringe or the like after the adhesive composition is applied to a tooth.

In addition, a polymerization inhibitor, a colorant, a fluorescent, an ultraviolet absorbent and the like may be properly added to the adhesive composition of the present invention as occasion demands.

Furthermore, for the purpose of imparting antibacterial property to the adhesive composition of the present invention, there may be contained in the adhesive composition of the present invention a cationic antibacterial compound such as cetyl pyridium chloride, chlorhexidine hydrochloride, a benzalkonium chloride, (meth)acryloyloxydodecyl pyridium bromide, (meth)acryloyloxyhexadecyl pyridium chloride or (meth)acryloyloxydecyl ammonium chloride.

In addition, for the purpose of imparting acid resistance to the adhesive composition of the present invention, there may be contained in the adhesive composition of the present invention a known fluorine compound which releases a fluorine ion, such as sodium fluoride, lithium fluoride or cetylamine hydrofluoride.

Furthermore, a filler can be contained in the adhesive composition of the present invention within an amount which would not impair the fluidity of the adhesive composition. The filler includes an inorganic filler, an organic filler or their composites.

The inorganic filler includes, for instance, minerals of which basic material is silica, such as silica, kaolin, clay and mica; ceramics of which basic material is silica, comprising $Al_2O_3$, $B_2O_3$, $TiO_2$, $ZrO_2$, $BaO$, $La_2O_3$, $SrO_2$, $CaO$ $P_2O_5$ and the like; glass such as lanthanum glass, barium glass, strontium glass, sodium glass, lithium borosilicate glass, zinc glass, fluoroaluminum borosilicate glass, borosilicate glass and bio glass; crystal silica, hydroxylapatite, alumina, titanium oxide, yttrium oxide, zirconia, calcium phosphate, barium sulfate, aluminum hydroxide, and the like.

The organic filler includes, for instance, organic resins such as polymethyl methacrylate, polyfunctional methacrylate polymer, polyamide, polystyrene, polyinyl chloride, chloroprene rubber, nitrile rubber and styrene-butadiene rubber. In addition, there can be also used an inorganic/organic composite filler in which the inorganic filler is dispersed in these organic resins, or in which the inorganic filler is coated with the above-mentioned organic resin. These fillers can be used alone or in combination of at least two kinds.

For the purpose of controlling the fluidity of the adhesive composition, these fillers may be used after previously subjecting to a surface treatment with a known agent for surface treatment, such as a silane coupling agent as occasion demands.

The agent for surface treatment includes, for instance, vinyltrimethoxysilane, vinyltriethoxysilane, vinyltrichlorosilane, vinyltri(β-methoxyethoxy)silane, γ-methacryloyloxypropyltrimethoxysilane, γ-glycidoxypropyltrimethoxysilane, γ-mercaptopropyltrimethoxysilane, γ-aminopropyltriethoxysilane, and the like.

The content of the filler in the adhesive composition of the present invention is not limited to specified ones. It is desired that the content is usually at most 30% by weight, preferably at most 10% by weight.

In addition, it is preferable that the viscosity of the adhesive composition is controlled to at most 1 Pa·s at 30° C. by dispersing a filler having an average particle diameter of 0.001 to 30 μm in the adhesive composition, from the viewpoints of penetrability, coatability, thermosetting property for teeth. When the adhesive composition of the present invention is used as an adhesive, it is preferable to control the viscosity to 0.1 to 1 Pa·s at 30° C.

The adhesive composition of the present invention can be used in various forms. For instance, the adhesive composition of the present invention can be used as an agent for pretreatment in order to bond to teeth a material to be bonded, such as a dental bonding material, a resin cement, a glass ionomer cement, a zinc phosphate cement, a polycarboxylate cement, a silicate cement or a zinc oxide eugenol cement, or to enhance adhesive properties (form 1). In addition, the adhesive composition also can be used as an adhesive for bonding a dental composite resin or a compomer for filling with teeth (form 2). Furthermore, the adhesive composition can be used as a fissure sealant material applied to pit and fissure, or a coating material for root and a proximal teeth portion (form 3), or can be used as a dentinal canal sealant material for the purpose of suppressing hyperesthesia (form 4).

When the adhesive composition is used in the form 1, it is preferable that the content of the acidic group-containing polymerizable monomer (a) in the adhesive composition is 5 to 40% by weight, that the content of the polymerizable monomer (b) is 0.005 to 20% by weight, and that the content of the hydrophilic polymerizable monomer (c) is 10 to 90% by weight, and it is more preferable that water (d) is contained in a content of 5 to 60% by weight. In this case, the weight ratio of (b)/(a), that is, the polymerizable monomer (b)/the acidic group-containing polymerizable monomer (a) is adjusted to 0.001 to 0.5.

In addition, when the adhesive composition is used in the forms 2 to 4, it is preferable that the content of the acidic group-containing polymerizable monomer (a) in the adhesive composition is 10 to 50% by weight, that the content of the polymerizable monomer (b) is 0.01 to 25% by weight, and that the content of the hydrophilic polymerizable monomer (c) is 5 to 50% by weight, and it is more preferable that water (d) is contained in a content of 0.1 to 10% by weight. In this case, the weight ratio of the polymerizable monomer (b)/the acidic group-containing polymerizable monomer (a) is adjusted to 0.001 to 0.5. In addition, it is preferable to include in the adhesive composition a hydrophobic polymerizable monomer other than the acidic group-containing polymerizable monomer (a), the polymerizable monomer (b) and the hydrophilic polymerizable monomer (c) in a content of 5 to 40% by weight, from the viewpoints of more improving adhesive property and peripherical sealability. In addition, for the purpose of improvements in coatability and mechanical strength, a filler may be contained in this adhesive composition within a range of at most 30% by weight.

The adhesive composition of the present invention can be used for not only hard tissues such as teeth but also crown restorative materials such as metals, porcelains, ceramics and composite resin cured products. Further, the adhesive composition of the present invention may be used in combination with a commercially available dental metal primer, a primer for bonding porcelain, an acidic etching agent or a tooth face cleaning agent such as a hypochlorite. Among them, it is especially preferable that the adhesive composition of the present invention is used in combination with the acidic etching agent, because more excellent peripherical sealability can be imparted to enamel.

EXAMPLES

Next, the present invention will be described more specifically on the basis of the following examples, but the present invention is by no means limited thereto.

The abbreviated names and symbols are as follows:
[Acidic Group-containing Hydrophobic Polymerizable Monomers]
MDP: 10-Methacryloyloxydecyl dihydrogen phosphate
MOP: 8-Methacryloyloxyoctyl dihydrogen phosphate
ADDP: 12-Acryloyloxydodecyl dihydrogen phosphate
MHEP: 16-Methacryloyloxyhexadecyl ethylhydrogen phosphate
MEPP: Methacryloyloxy ethylphenyl phosphonate
MDPP: 10-Methacryloyloxydecyl phosphonic acid
4-MHPT: 4-Methacryloyloxyhexyl oxycarbonyl phthalic acid
[Hydroxyl Group-containing Polymerizable Monomers]
4HM: 4-Hydroxybutyl methacrylate
6HM: 6-Hydroxyhexyl methacrylate
8HM: 8-Hydroxyoctyl methacrylate
10HM: 10-Hydroxydecyl methacrylate
12HA: 12-Hydroxydodecyl methacrylate
16HA: 16-Hydroxyhexadecyl methacrylate
[Hydrophilic Polymerizable Monomers]
HEMA: 2-Hydroxyethyl methacrylate
9G: Polyethylene glycol dimethacrylate (number of moles of oxyethylene group added being 9)
14G: Polyethylene glycol dimethacrylate (number of moles of oxyethylene group added being 14)
[Polymerization Initiator and Reducing Agent]
CQ: Camphorquinone
TMDPO: 2,4,6-Trimethylbenzoyldiphenylphosphine oxide
DEPT: N,N-Di(2-hydroxyethyl)-p-toluidine
TPBSS: Sodium 2,4,6-triisopropylbenzenesulfinate
DMAB: N,N-Dimethylaminobenzophenone
[Polymerization Inhibitor]
BHT: t-Butylhydroxytoluene
[Other Polymerizable Monomers]
Bis-GMA: Bisphenol A diglycidyl methacrylate
UDMA: [2,2,4-Trimethylhexamethylenebis(2-carbamoyloxyethyl)]dimethacrylate Example 1

An adhesive composition composed of 20 parts by weight of MDP, 0.02 parts by weight of methacrylic acid, 40 parts by weight of HEMA and 40 parts by weight of distilled water was prepared. The adhesive strength and peripherical sealability were determined in accordance with the following testing method for adhesive strength and testing method for peripherical sealability. The results are shown in Table 1.
[Testing Method for Adhesive Strength]
Bovine front teeth were smoothly wet-grinded with #1000 silicon carbide paper (manufactured by Nippon Kenshi K.K.) to expose their enamel surfaces or dentin surfaces, and thereafter water on the surfaces was blown away with a dental air syringe. An adhesive tape having a thickness of about 150 $\mu$M with a hole opening having a diameter of 3 mm was pasted to the exposed enamel surfaces or dentin surfaces, and the adhesive composition obtained in Example 1 was applied to the hole with a brush. The adhesive composition was allowed to stand for 30 seconds, and thereafter dried with an air syringe to a degree such that the adhesive composition had no fluidity. A photopolymerizable dental bonding material "Clearfil Megabond" (manufactured by Kuraray Co., Ltd., trade name) was applied onto the dried adhesive composition with a brush so that its thickness became about 100 $\mu$m. The resulting coat was photo-irradiated with a dental photoirradiator "LIGHTEL II" (manufactured by Gunma Ushio Denki K.K., trade name) for 10 seconds to cure the coat. Further, a commercially available photopolymerizable dental composite resin "Clearfil AP-X" (manufactured by Kuraray Co., Ltd., trade name) was mounted on the cured coat, and covered with a film made of EVAL (manufactured by Kuraray Co., Ltd., registered trademark). Thereafter, the slide glass was pressed over the film, and photo-irradiated for 40 seconds with the above-mentioned photoirradiator to cure the composite resin.

A stainless steel rod was bonded to the cured surface with a commercially available dental resin cement "Panavia 21" (manufactured by Kuraray Co., Ltd., trade name) to give a test piece. After 30 minutes, the test piece was immersed in water of 37° C. for 24 hours, and thereafter a thermal cycle comprising immersing the test piece in cold water of 4° C. for one minute and in hot water of 60° C. for one minute was carried out 2000 times. Thereafter, its adhesive strength was determined. A universal tester (manufactured by Instron) was used for the determination of the adhesive strength, and the tensile adhesive strength was determined under the conditions of a cross head speed of 2 mm/minute. The determination value for each adhesive strength was expressed as an average value of the determination values of 8 test pieces.
[Testing Method for Peripherical Sealability]
A cavity having a diameter of about 4 mm and a depth of about 3 mm was formed by using a dental air turbine so that the cervical line of the molar portion of a human evulsed tooth was positioned at the center. The adhesive composition obtained in Example 1 was applied to the internal surface of the cavity, and the adhesive composition was allowed to stand for 30 seconds, and thereafter dried with an air syringe to a degree such that the adhesive composition had no fluidity. A photopolymerizable dental bonding material "Clearfil Megabond" (manufactured by Kuraray Co., Ltd., trade name) was applied to the internal surface of the cavity so that its thickness became about 100 $\mu$m. The resulting coat was photo-irradiated for 10 seconds with a dental photoirradiator "LIGHTEL II" (manufactured by Gunma Ushio Denki K.K., trade name) to cure the coat. Further, a commercially available photopolymerizable dental composite resin "Clearfil AP-X" (manufactured by Kuraray Co., Ltd., trade name) was filled in the cavity, and photo-irradiated for 40 seconds with the above-mentioned photoirradiator to cure the composite resin. Subsequently, in order to prevent the penetration of the colorant from the tip of tooth root and the scissure at crown and the like, "Clearfil Megabond" (manufactured by Kuraray Co., Ltd., trade name) was applied to the portions other than the cavity restorative portion and its surroundings, and photo-irradiated for 30 seconds with the above-mentioned photoirradiator to cure the resin.

The resulting test piece was immersed in water at 37° C. for 24 hours, and thereafter a thermal cycle comprising immersing in cold water of 4° C. for one minute and in hot water of 60° C. for one minute was carried out 2000 times. Thereafter, the test piece was immersed in a 0.2% aqueous basic fuchsine solution at 37° C. for 24 hours, and thereafter the test piece was taken out from the solution and washed with water. The test piece was dried with a dental air syringe, and its restored portion was divided into three portions lengthwise using a low-speed diamond cutter to give three slices per tooth. Fifteen slices were prepared from five molar teeth from human teeth in total.

The evaluation of the penetration of the colorant was made by observing both the cavity margin of a tooth top side (enamel side) and the cavity margin of a gingival side (dentin side) by naked eyes with a light microscope (magnification: 25 times), obtaining the following scores, and averaging the scores of 15 slices.

Score 0: No penetration of a colorant to wall and bottom of the cavity is recognized.
Score 1: No penetration of a colorant to the bottom of the cavity is recognized, but as to the wall of the cavity, penetration of the colorant to at most ½ of the wall of the cavity is recognized.
Score 2: No penetration of a colorant to the bottom of the cavity is recognized, but as to the wall of the cavity, penetration of the colorant to at least ½ of the wall of the cavity is recognized.
Score 3: Penetration of a colorant to wall and bottom of the cavity is recognized.

Examples 2 to 7 and Comparative Examples 1 to 3

Adhesive compositions in which the amount of methacrylic acid was changed were prepared as shown in Table 1. The adhesive strength test and peripherical sealability test were carried out in the same manner as in Example 1 using these adhesive compositions. The results are also shown in Table 1.

As is clear from the results shown in Table 1, when the adhesive compositions of the present invention in which the weight ratio of methacrylic acid/MDP is controlled to the range of 0.001 to 0.5 (Examples 1 to 7) are used, it can be seen that excellent adhesive strength and excellent peripherical sealability are exhibited.

On the other hand, when the adhesive composition in which methacrylic acid is not contained (Comparative Example 1) is used, it can be seen that excellent adhesive strength is exhibited, but peripherical sealability is drastically deteriorated.

In addition, when the adhesive composition in which the weight ratio of methacrylic acid/MDP is controlled to 1.0 or 2.0 (Comparative Examples 2 and 3) is used, it can seen that adhesive strength is clearly lowered, and that peripherical sealability is deteriorated.

Examples 8 to 14 and Comparative Examples 4 to 6

Adhesive compositions composed of MDP, 10HM, HEMA, distilled water and the like were prepared as shown in Table 2. The adhesive strength test and peripherical sealability test were carried out in the same manner as in Example 1 using these adhesive compositions. The results are also shown in Table 2.

TABLE 1

|  | Examples | | | | | | | Comparative Examples | | |
|---|---|---|---|---|---|---|---|---|---|---|
|  | 1 | 2 | 3 | 4 | 5 | 6 | 7 | 1 | 2 | 3 |
| Adhesive Composition (parts by weight) | | | | | | | | | | |
| MDP (a) | 20 | 20 | 20 | 20 | 20 | 20 | 20 | 20 | 20 | 20 |
| Methacrylic acid (b) | 0.02 | 0.1 | 0.2 | 1 | 2 | 6 | 10 | 0 | 20 | 40 |
| HEMA (c) | 40 | 40 | 40 | 40 | 40 | 40 | 40 | 40 | 40 | 40 |
| Distilled Water (d) | 40 | 40 | 40 | 40 | 40 | 40 | 40 | 40 | 40 | 40 |
| Methacrylic Acid/MDP (weight ratio) | 0.001 | 0.005 | 0.01 | 0.05 | 0.1 | 0.3 | 0.5 | 0 | 1.0 | 2.0 |
| Adhesive Strength | | | | | | | | | | |
| Enamel of Bovine Tooth (MPa) | 19.3 | 19.4 | 21.2 | 22.1 | 22.4 | 20.1 | 18.5 | 19.3 | 16.5 | 15.5 |
| Dentin of Bovine Tooth (MPa) | 19.6 | 19.8 | 20.2 | 20.5 | 20.7 | 18.3 | 17.4 | 19.7 | 13.2 | 13.0 |
| Peripherical Sealability | | | | | | | | | | |
| Tooth Top Side (Enamel Side) | 0.7 | 0.5 | 0.3 | 0.3 | 0.3 | 0.5 | 0.7 | 2.0 | 1.5 | 1.6 |
| Gingival Side (Dentin Side) | 0.7 | 0.5 | 0.2 | 0.2 | 0.2 | 0.4 | 0.6 | 2.1 | 1.3 | 1.4 |

TABLE 2

|  | Examples | | | | | | | Comparative Examples | | |
|---|---|---|---|---|---|---|---|---|---|---|
|  | 8 | 9 | 10 | 11 | 12 | 13 | 14 | 4 | 5 | 6 |
| Adhesive Composition (parts by weight) | | | | | | | | | | |
| MDP (a) | 20 | 20 | 20 | 20 | 20 | 20 | 20 | 20 | 20 | 20 |
| Methacrylic acid (b) | 0.02 | 0.1 | 0.2 | 0.2 | 2 | 6 | 10 | 0 | 20 | 40 |
| HEMA (c) | 40 | 40 | 80 | 40 | 40 | 40 | 40 | 40 | 40 | 40 |
| Distilled Water (d) | 40 | 40 | 0 | 40 | 40 | 40 | 40 | 40 | 40 | 40 |
| 10 HM/MDP (weight ratio) | 0.001 | 0.005 | 0.01 | 0.01 | 0.1 | 0.3 | 0.5 | 0 | 1.0 | 2.0 |
| Adhesive Strength | | | | | | | | | | |
| Enamel of Bovine Tooth (MPa) | 19.4 | 19.3 | 18.9 | 21.0 | 21.8 | 20.1 | 18.3 | 19.2 | 16.4 | 15.2 |
| Dentin of Bovine Tooth (MPa) | 19.5 | 19.8 | 18.5 | 20.7 | 20.9 | 18.3 | 17.2 | 19.7 | 13.0 | 13.1 |
| Peripherical Sealability | | | | | | | | | | |
| Tooth Top Side (Enamel Side) | 0.8 | 0.5 | 0.4 | 0.3 | 0.3 | 0.5 | 0.8 | 2.0 | 1.0 | 1.1 |
| Gingival Side (Dentin Side) | 0.7 | 0.6 | 0.4 | 0.3 | 0.2 | 0.4 | 0.6 | 2.1 | 1.4 | 1.5 |

As is clear from the results shown in Table 2, when the adhesive compositions in which the weight ratio of 10HM/MDP is controlled to the range of 0.001 to 0.5 (Examples 8 to 14) are used, it can be seen that excellent adhesive strength and excellent peripherical sealability are exhibited.

On the other hand, when the adhesive composition in which 10HM is not contained (Comparative Example 4) is used, it can be seen that excellent adhesive strength is exhibited, but peripherical sealability is drastically deteriorated.

In addition, when the adhesive composition in which the weight ratio of 10HM/MDP is controlled to 1.0 or 2.0 (Comparative Examples 5 and 6) is used, it can be seen that adhesive strength is clearly lowered, and that peripherical sealability is deteriorated.

Examples 15 to 18

Adhesive compositions composed of MEPP, methacrylic acid, HEMA, distilled water, CQ, DEPT, TPBSS and DMAB were prepared as shown in Table 3. The adhesive strength test and peripherical sealability test were carried out in the same manner as in Example 1 using these adhesive compositions. The results are also shown in Table 3.

Comparative Examples 7 to 10

Adhesive compositions in which methacrylic acid was removed from the adhesive compositions used in Examples 15 to 18 were prepared as shown in Table 3. The adhesive strength test and peripherical sealability test were carried out in the same manner as in Example 1 using these adhesive compositions. The results are also shown in Table 3.

As is clear from the results shown in Table 3, when the adhesive compositions in which methacrylic acid is blended (Examples 15 to 18) are used, it can be seen that excellent adhesive strength and excellent peripherical sealability are exhibited.

On the other hand, when the adhesive compositions in which methacrylic acid is not contained (Comparative Examples 7 to 10) are used, it can be seen that excellent adhesive strength is exhibited, but peripherical sealability is drastically deteriorated.

Examples 19 to 23

Adhesive compositions composed of MDP, 10HM, HEMA, distilled water, CQ, DEPT, TPBSS and DMAB were prepared as shown in Table 4. The adhesive strength test and peripherical sealability test were carried out in the same manner as in Example 1 using these adhesive compositions. The results are also shown in Table 4.

Comparative Examples 11 to 15

Adhesive compositions in which 10HM was removed from the adhesive compositions used in Examples 19 to 23 were prepared as shown in Table 4. The adhesive strength test and peripherical sealability test were carried out in the same manner as in Example 1 using these adhesive compositions. The results are also shown in Table 4.

TABLE 3

|  | Examples | | | | Comparative Examples | | | |
| --- | --- | --- | --- | --- | --- | --- | --- | --- |
|  | 15 | 16 | 17 | 18 | 7 | 8 | 9 | 10 |
| Adhesive Composition (parts by weight) | | | | | | | | |
| MEPP (a) | 10 | 15 | 30 | 40 | 10 | 15 | 30 | 40 |
| Methacrylic acid (b) | 0.1 | 0.15 | 0.3 | 0.4 | 0 | 0 | 0 | 0 |
| HEMA (c) | 45 | 42.5 | 35 | 30 | 45 | 42.5 | 35 | 30 |
| Distilled Water (d) | 45 | 42.5 | 35 | 30 | 45 | 42.5 | 35 | 30 |
| CQ (e) | 0.5 | 0.5 | 0.5 | 0.5 | 0.5 | 0.5 | 0.5 | 0.5 |
| DEPT | 5 | 5 | 5 | 5 | 5 | 5 | 5 | 5 |
| TPBSS | 2 | 2 | 2 | 2 | 2 | 2 | 2 | 2 |
| DMAB | 0.3 | 0.3 | 0.3 | 0.3 | 0.3 | 0.3 | 0.3 | 0.3 |
| Methacrylic Acid/MEPP (weight ratio) | 0.01 | 0.01 | 0.01 | 0.01 | 0 | 0 | 0 | 0 |
| Adhesive Strength | | | | | | | | |
| Enamel of Bovine Tooth (MPa) | 18.5 | 22.6 | 22.6 | 19.8 | 18.0 | 21.4 | 22.8 | 19.1 |
| Dentin of Bovine Tooth (MPa) | 17.4 | 20.3 | 20.6 | 19.8 | 18.0 | 20.4 | 20.8 | 19.1 |
| Peripherical Sealability | | | | | | | | |
| Tooth Top Side (Enamel Side) | 0.4 | 0.3 | 0.3 | 0.4 | 2.1 | 1.8 | 1.8 | 2.2 |
| Gingival Side (Dentin Side) | 0.3 | 0.3 | 0.3 | 0.4 | 2.0 | 1.7 | 1.7 | 1.9 |

TABLE 4

|  | Examples | | | | | Comparative Examples | | | | |
| --- | --- | --- | --- | --- | --- | --- | --- | --- | --- | --- |
|  | 19 | 20 | 21 | 22 | 23 | 11 | 12 | 13 | 14 | 15 |
| Adhesive Composition (parts by weight) | | | | | | | | | | |
| MDP (a) | 10 | 15 | 30 | 30 | 40 | 10 | 15 | 30 | 30 | 30 |
| 10 HM (b) | 0.1 | 0.15 | 0.3 | 0.3 | 0.4 | 0 | 0 | 0 | 0 | 0 |
| HEMA (c) | 45 | 42.5 | 70 | 35 | 30 | 45 | 42.5 | 70 | 35 | 30 |
| Distilled water (d) | 45 | 42.5 | 0 | 35 | 30 | 45 | 42.5 | 0 | 35 | 30 |
| CQ (e) | 0.5 | 0.5 | 0.5 | 0.5 | 0.5 | 0.5 | 0.5 | 0.5 | 0.5 | 0.5 |
| DEPT | 3.0 | 3.0 | 3.0 | 3.0 | 3.0 | 3.0 | 3.0 | 3.0 | 3.0 | 3.0 |
| TPBSS | 0.5 | 0.5 | 0.5 | 0.5 | 0.5 | 0.5 | 0.5 | 0.5 | 0.5 | 0.5 |
| DMAB | 0.5 | 0.5 | 0.5 | 0.5 | 0.5 | 0.5 | 0.5 | 0.5 | 0.5 | 0.5 |
| 10 HM/MDP (weight ratio) | 0.01 | 0.01 | 0.01 | 0.01 | 0.01 | 0 | 0 | 0 | 0 | 0 |
| Adhesive Strength | | | | | | | | | | |
| Enamel of Bovine Tooth (MPa) | 18.4 | 21.3 | 18.4 | 22.0 | 18.5 | 18.1 | 21.2 | 18.3 | 21.4 | 18.2 |
| Dentin of Bovine Tooth (MPa) | 18.6 | 21.5 | 18.3 | 21.7 | 18.1 | 18.0 | 21.0 | 18.2 | 21.8 | 18.0 |
| Peripheral Sealability | | | | | | | | | | |
| Tooth Top Side (Enamel Side) | 0.4 | 0.3 | 0.4 | 0.3 | 0.4 | 1.5 | 1.8 | 1.3 | 1.5 | 1.3 |
| Gingival Side (Dentin Side) | 0.4 | 0.3 | 0.4 | 0.3 | 0.4 | 1.4 | 1.6 | 1.4 | 1.5 | 1.7 |

As is clear from the results shown in Table 4, when the adhesive compositions in which 10HM is blended (Examples 19 to 23) are used, it can be seen that excellent adhesive strength and excellent peripherical sealability are exhibited.

On the other hand, when the adhesive compositions in which 10HM is not contained (Comparative Examples 11 to 15) are used, it can be seen that excellent adhesive strength is exhibited, but peripherical sealability is drastically deteriorated.

Examples 24 to 31

Adhesive compositions prepared by adding methacrylic acid, acrylic acid, methacrylic acid chloride or 2-methylpropenedithionic acid to a composition composed of MDPP or 4-MHPT, HEMA, distilled water, DEPT, TPBSS and the like were prepared as shown in Table 5. The adhesive strength test and peripherical sealability test were carried out in the same manner as in Example 1 using these adhesive compositions. The results are also shown in Table 5.

Comparative Examples 16 and 17

Adhesive compositions in which methacrylic acid was removed from an adhesive composition used in Example 24 and an adhesive composition used in Example 28 were prepared as shown in Table 5. The adhesive strength test and peripherical sealability test were carried out in the same manner as in Example 1 using these adhesive compositions. The results are also shown in Table 5.

TABLE 5

|  | Examples | | | | | | | | Comp. Ex. | |
| --- | --- | --- | --- | --- | --- | --- | --- | --- | --- | --- |
|  | 24 | 25 | 26 | 27 | 28 | 29 | 30 | 31 | 16 | 17 |
| Adhesive Composition (parts by weight) Acidic Group-Containing Polymerizable Monomer (a) | | | | | | | | | | |
| MDPP | 15 | 15 | 15 | 15 | 0 | 0 | 0 | 0 | 15 | 0 |
| 4-MHPT | 0 | 0 | 0 | 0 | 15 | 15 | 15 | 15 | 0 | 15 |
| Polymerizable Monomer (b) | | | | | | | | | | |
| Methacrylic Acid | 0.75 | 0 | 0 | 0 | 0.75 | 0 | 0 | 0 | 0 | 0 |
| Acrylic Acid | 0 | 0.75 | 0 | 0 | 0 | 0.75 | 0 | 0 | 0 | 0 |
| Methacrylic Acid Chloride | 0 | 0 | 0.75 | 0 | 0 | 0 | 0.75 | 0 | 0 | 0 |
| 2-Methylpropenedithionic Acid | 0 | 0 | 0 | 0.75 | 0 | 0 | 0 | 0.75 | 0 | 0 |
| HEMA (c) | 42.5 | 42.5 | 42.5 | 42.5 | 42.5 | 42.5 | 42.5 | 42.5 | 42.5 | 42.5 |
| Distilled Water (d) | 42.5 | 42.5 | 42.5 | 42.5 | 42.5 | 42.5 | 42.5 | 42.5 | 42.5 | 42.5 |
| DEPT | 5 | 5 | 5 | 5 | 5 | 5 | 5 | 5 | 5 | 5 |
| TPBSS | 2 | 2 | 2 | 2 | 2 | 2 | 2 | 2 | 2 | 2 |
| Polymerizable Monomer (b)/ Acidic Group-Containing Polymerizable Monomer (a) (weight ratio) | 0.05 | 0.05 | 0.05 | 0.05 | 0.05 | 0.05 | 0.05 | 0.05 | 0 | 0 |
| Adhesive Strength | | | | | | | | | | |
| Enamel of Bovine Tooth (MPa) | 20.3 | 20.4 | 20.2 | 20.1 | 15.4 | 15.1 | 15.5 | 15.8 | 20.5 | 15.5 |
| Dentin of Bovine Tooth (MPa) | 20.2 | 20.8 | 20.1 | 20.0 | 15.7 | 15.7 | 15.4 | 15.6 | 19.8 | 15.0 |

TABLE 5-continued

|  | Examples | | | | | | | | Comp. Ex. | |
| --- | --- | --- | --- | --- | --- | --- | --- | --- | --- | --- |
|  | 24 | 25 | 26 | 27 | 28 | 29 | 30 | 31 | 16 | 17 |
| Peripherical Sealability | | | | | | | | | | |
| Tooth Top Side (Enamel Side) | 0.2 | 0.2 | 0.5 | 0.5 | 0.3 | 0.3 | 0.6 | 0.6 | 1.8 | 2.4 |
| Gingival Side (Dentin Side) | 0.2 | 0.2 | 0.5 | 0.5 | 0.3 | 0.3 | 0.6 | 0.6 | 1.9 | 2.6 |

As is clear from the results shown in Table 5, when the adhesive compositions in which methacrylic acid, acrylic acid, methacrylic acid chloride or 2-methylpropenedithionic acid is blended (Examples 24 to 31) are used, it can be seen that excellent adhesive strength and excellent peripherical sealability are exhibited.

On the other hand, when the adhesive compositions in which methacrylic acid and the like are not contained (Comparative Examples 16 and 17) are used, it can be seen that excellent adhesive strength is exhibited, but peripherical sealability is drastically deteriorated.

Examples 32 to 40

Adhesive compositions composed of MDP, 10HM, HEMA, distilled water, methacrylic acid or acrylic acid, DEPT and TPBSS were prepared as shown in Table 6. The adhesive strength test and peripherical sealability test were carried out in the same manner as in Example 1 using these adhesive compositions. The results are also shown in Table 6.

As is clear from the results shown in Table 6, when the adhesive compositions of the present invention in which the weight ratio of methacrylic acid/MDP or the weight ratio of acrylic acid/MDP is controlled to the range of 0.001 to 0.5 (Examples 32 to 40) are used, it can be seen that very excellent peripherical sealability is exhibited.

Examples 41 to 50

Adhesive compositions composed of a phosphate group-containing polymerizable monomer having a different alkylene chain length, a hydroxyl group-containing polymerizable monomer having a different alkylene chain length, HEMA and distilled water were prepared as shown in Table 7. The adhesive strength test and peripherical sealability test were carried out in the same manner as in Example 1 using these adhesive compositions. The results are also shown in Table 7.

TABLE 6

|  | Examples | | | | | | | | |
| --- | --- | --- | --- | --- | --- | --- | --- | --- | --- |
|  | 32 | 33 | 34 | 35 | 36 | 37 | 38 | 39 | 40 |
| Adhesive Composition (parts by weight) | | | | | | | | | |
| MDP (a) | 20 | 20 | 20 | 20 | 20 | 20 | 20 | 20 | 20 |
| 10 HM (b1) | 0.4 | 0.4 | 0.4 | 0.4 | 0.4 | 0.4 | 0.4 | 0.4 | 0.4 |
| HEMA (c) | 50 | 50 | 50 | 50 | 50 | 50 | 50 | 50 | 50 |
| Distilled Water (d) | 30 | 30 | 30 | 30 | 30 | 30 | 30 | 30 | 30 |
| Methacrylic Acid (b2) | — | 0.02 | 0.1 | 0.2 | — | 2 | 6 | 8 | 9 |
| Acrylic Acid (b2) | — | — | — | — | 0.2 | — | — | — | — |
| DEPT | 3.5 | 3.5 | 3.5 | 3.5 | 3.5 | 3.5 | 3.5 | 3.5 | 3.5 |
| TPBSS | 1.0 | 1.0 | 1.0 | 1.0 | 1.0 | 1.0 | 1.0 | 1.0 | 1.0 |
| 10 HM/MDP (weight ratio) | 0.02 | 0.02 | 0.02 | 0.02 | 0.02 | 0.02 | 0.02 | 0.02 | 0.02 |
| (Meth)acrylic Acid/MDP (weight ratio) | 0 | 0.001 | 0.005 | 0.01 | 0.01 | 0.1 | 0.3 | 0.4 | 0.45 |
| Adhesive Strength | | | | | | | | | |
| Enamel of Bovine Tooth (MPa) | 20.7 | 21.5 | 21.9 | 21.6 | 22.1 | 22.3 | 21.9 | 17.4 | 14.2 |
| Dentin of Bovine Tooth (MPa) | 20.8 | 20.9 | 21.5 | 21.7 | 22.3 | 21.0 | 20.5 | 17.1 | 14.1 |
| Peripherical Sealability | | | | | | | | | |
| Tooth Top Side (Enamel Side) | 0.4 | 0.2 | 0.2 | 0.3 | 0.3 | 0.2 | 0.3 | 0.4 | 0.4 |
| Gingival Side (Dentin Side) | 0.4 | 0.2 | 0.2 | 0.1 | 0.1 | 0.2 | 0.3 | 0.3 | 0.5 |

TABLE 7

|  | Examples | | | | | | | | | |
| --- | --- | --- | --- | --- | --- | --- | --- | --- | --- | --- |
|  | 41 | 42 | 43 | 44 | 45 | 46 | 47 | 48 | 49 | 50 |
| Adhesive Composition (parts by weight) Phosphate Group-Containing Polymerizable Monomer (a) | | | | | | | | | | |
| MOP | 15 | 15 | 15 | 0 | 0 | 0 | 0 | 0 | 0 | 0 |
| MDP | 0 | 0 | 0 | 15 | 15 | 15 | 0 | 0 | 0 | 0 |
| ADDP | 0 | 0 | 0 | 0 | 0 | 0 | 15 | 15 | 0 | 0 |
| MHEP | 0 | 0 | 0 | 0 | 0 | 0 | 0 | 0 | 15 | 15 |
| Hydroxyl Group-Containing Polymerizable Monomer (b) | | | | | | | | | | |
| 6 HM | 0.3 | 0 | 0 | 0 | 0 | 0 | 0 | 0 | 0 | 0 |
| 8 HM | 0 | 0.3 | 0 | 0.3 | 0 | 0 | 0 | 0 | 0 | 0 |
| 10 HM | 0 | 0 | 0.3 | 0 | 0.3 | 0 | 0 | 0 | 0.3 | 0 |
| 12 HM | 0 | 0 | 0 | 0 | 0 | 0.3 | 0.3 | 0 | 0 | 0 |
| 16 HM | 0 | 0 | 0 | 0 | 0 | 0 | 0 | 0.3 | 0 | 0.3 |
| HEMA (c) | 42.5 | 42.5 | 42.5 | 42.5 | 42.5 | 42.5 | 42.5 | 42.5 | 42.5 | 42.5 |
| Distilled Water (d) | 42.5 | 42.5 | 42.5 | 42.5 | 42.5 | 42.5 | 42.5 | 42.5 | 42.5 | 42.5 |
| Hydroxyl Group-Containing Polymerizable Monomer (b)/Phosphate Group-Containing Polymerizable Monomer (a) (weight ratio) | 0.02 | 0.02 | 0.02 | 0.02 | 0.02 | 0.02 | 0.02 | 0.02 | 0.02 | 0.02 |
| Adhesive Strength | | | | | | | | | | |
| Enamel of Bovine Tooth (MPa) | 17.4 | 17.3 | 16.8 | 21.9 | 21.8 | 22.1 | 19.3 | 18.5 | 17.4 | 17.9 |
| Dentin of Bovine Tooth (MPa) | 17.5 | 17.8 | 16.1 | 20.5 | 22.9 | 21.3 | 19.2 | 18.7 | 17.1 | 17.8 |
| Peripherical Sealability | | | | | | | | | | |
| Tooth Top Side (Enamel Side) | 0.7 | 0.3 | 0.4 | 0.5 | 0.3 | 0.6 | 0.4 | 0.6 | 0.5 | 0.4 |
| Gingival Side (Dentin Side) | 0.6 | 0.3 | 0.5 | 0.4 | 0.3 | 0.5 | 0.4 | 0.6 | 0.4 | 0.3 |

Comparative Examples 18 to 21

Adhesive compositions composed of a phosphate group-containing polymerizable monomer having a different alkylene chain length, 4HM, HEMA and distilled water were prepared as shown in Table 8. The adhesive strength test and peripherical sealability test were carried out in the same manner as in Example 1 using these adhesive compositions. The results are also shown in Table 8.

TABLE 8

|  | Comparative Examples | | | |
| --- | --- | --- | --- | --- |
|  | 18 | 19 | 20 | 21 |
| Adhesive Composition (parts by weight) Phosphate Group-Containing Polymerizable Monomer (a) | | | | |
| MOP | 15 | 0 | 0 | 0 |
| MDP | 0 | 15 | 0 | 0 |
| ADDP | 0 | 0 | 15 | 0 |
| MHEP | 0 | 0 | 0 | 15 |
| 4HM | 0.3 | 0.3 | 0.3 | 0.3 |
| HEMA (c) | 42.5 | 42.5 | 42.5 | 42.5 |
| Distilled Water (d) | 42.5 | 42.5 | 42.5 | 42.5 |
| 4HM/Phosphate Group-Containing Polymerizable Monomer (a) (weight ratio) | 0.02 | 0.02 | 0.02 | 0.02 |
| Adhesive Strength | | | | |
| Enamel of Bovine Tooth (MPa) | 17.1 | 21.4 | 19.0 | 17.4 |
| Dentin of Bovine Tooth (MPa) | 17.8 | 21.3 | 18.9 | 17.8 |
| Peripherical Sealability | | | | |
| Tooth Top Side (Enamel Side) | 1.5 | 1.3 | 1.4 | 1.7 |
| Gingival Side (Dentin Side) | 1.3 | 1.5 | 1.6 | 2.0 |

As is clear from the results shown in Table 7, when the adhesive compositions in which the phosphate group-containing polymerizable monomer and the hydroxyl group-containing polymerizable monomer having an alkylene chain length of at least 6 are blended (Examples 41 to 50) are used, it can be seen that excellent adhesive strength and excellent peripherical sealability are exhibited. Especially, in the case of the combination of the phosphate group-containing polymerizable monomer and the hydroxyl group-containing polymerizable monomer in which the number of alkylene chain length is the same (Examples 42, 25, 47 and 50), further excellent peripherical sealability is exhibited.

On the other hand, as is clear from the results shown in Table 8, when the adhesive compositions in which 4HM is contained as the hydroxyl group-containing polymerizable monomer (Comparative Examples 18 to 21) are used, it can be seen that excellent adhesive strength is exhibited, but peripherical sealability is drastically deteriorated.

Example 51 and Comparative Example 22

Some tests were carried out in accordance with the testing method for adhesive strength and the testing method for peripherical sealability of Example 1 using the adhesive composition of Example 3 or Comparative Example 1. However, as the photopolymerizable bonding material, a bonding material composed of 61 parts by weight of Bis-GMA, 31 parts by weight of HEMA, 5 parts by weight of colloidal silica [Aerosil 380, manufactured by Nippon Aerosil K.K.], 2 parts by weight of CQ, and 1 part by weight of DMAB was prepared and used in place of "Clearfil Megabond" (manufactured by Kuraray Co., Ltd., trade name).

As a result, since the adhesive composition of Example 3 had an adhesive strength of 17.5 MPa against bovine enamel and an adhesive strength of 15.8 MPa against bovine dentine, adhesive strength is excellent. In addition, since the adhesive composition of Example 3 had a score of 0.5 for the cavity margin of a tooth top side (enamel side) and a score of 0.4 for the cavity margin of a gingival side (dentin side), peripherical sealability is excellent.

On the other hand, since the adhesive composition of Comparative Example 1 had an adhesive strength of 17.1 MPa against bovine enamel and an adhesive strength of 15.2 MPa against bovine dentine, the adhesive strength is excellent. However, since the score for the cavity margin of a tooth top side (enamel side) was 2.1 and the score for the cavity margin of a gingival side (dentin side) was 2.4, peripherical sealability is clearly deteriorated.

Example 52

An adhesive composition composed of 35 parts by weight of MDP, 2 parts by weight of methacrylic acid, 40 parts by weight of HEMA, 5 parts by weight of Bis-GMA, 10 parts by weight of 14G, 5 parts by weight of distilled water, 2.5 parts by weight of TMDPO, 0.5 parts by weight of DMAB and 0.05 parts by weight of BHT was prepared. Adhesive strength was determined in accordance with the testing method for adhesive strength described below using this adhesive composition. As a result, since the adhesive strength against bovine enamel was 17.5 MPa and the adhesive strength against bovine dentine was 14.6 MPa, adhesive strength is excellent.

In addition, peripherical sealability was determined in accordance with the testing method for peripherical sealability described below. As a result, since the score for the cavity margin of a tooth top side (enamel side) was 0.3 and the score for the cavity margin of a gingival side (dentin side) was 0.3, peripherical sealability is excellent.

[Testing Method for Adhesive Strength]

Bovine front teeth were smoothly wet-grinded with #1000 silicon carbide paper (manufactured by Nippon Kenshi K.K.) to expose their enamel surfaces or dentin surfaces, and thereafter water on the surfaces was blown away with a dental air syringe. An adhesive tape having a thickness of about 150 μm with a hole opening having a diameter of 3 mm was pasted to the exposed enamel surfaces or dentin surfaces, and the adhesive composition obtained in Example 52 was applied in a thickness of about 100 μm to the hole with a brush. After 30 seconds, the resulting coat was photo-irradiated with a dental photoirradiator "LIGHTEL II" (manufactured by Gunma Ushio Denki K.K., trade name) for 30 seconds to cure the coat. Further, a commercially available photopolymerizable dental composite resin "Clearfil AP-X" (manufactured by Kuraray Co., Ltd., trade name) was mounted on the cured coat, and covered with a film made of EVAL (manufactured by Kuraray Co., Ltd., registered trademark). Thereafter, the slide glass was pressed over the film, and photo-irradiated for 40 seconds with the above-mentioned photoirradiator to cure the composite resin.

A stainless steel rod was bonded to the cured surface with a commercially available dental resin cement "Panavia 21" (manufactured by Kuraray Co., Ltd., trade name) to give a test piece. After 30 minutes, the test piece was immersed in water of 37° C. for 24 hours, and thereafter a thermal cycle comprising immersing the test piece in cold water of 4° C. for one minute and in hot water of 60° C. for one minute was carried out 2000 times. Thereafter, its adhesive strength was determined. A universal tester (manufactured by Instron) was used for the determination of the adhesive strength, and the tensile adhesive strength was determined under the conditions of a cross head speed of 2 mm/minute. The determination value for each adhesive strength was expressed as an average value of the determination values of 8 test pieces.

[Testing Method for Peripherical Sealability]

A cavity having a diameter of about 4 mm and a depth of about 3 mm was formed by using a dental air turbine so that the cervical line of the molar portion of a human evulsed tooth was positioned at the center. The adhesive composition obtained in Example 52 was applied to the internal surface of the cavity so that its thickness became about 100 μm. After 30 seconds, the resulting coat was photo-irradiated for 30 seconds with a dental photoirradiator "LIGHTEL II" (manufactured by Gunma Ushio Denki K.K., trade name) to cure the coat. Further, a commercially available photopolymerizable dental composite resin "Clearfil AP-X" (manufactured by Kuraray Co., Ltd., trade name) was filled in the cavity, and photo-irradiated for 40 seconds with the above-mentioned photoirradiator to cure the composite resin. Subsequently, in order to prevent the penetration of the colorant from the tip of tooth root and the scissure at crown and the like, "Clearfil Megabond" (manufactured by Kuraray Co., Ltd., trade name) was applied to the portions other than the cavity restorative portion and its surroundings, and photo-irradiated for 30 seconds with the above-mentioned photoirradiator to cure the resin.

The resulting test piece was immersed in water at 37° C. for 24 hours, and thereafter a thermal cycle comprising immersing in cold water of 4° C. for one minute and in hot water of 60° C. for one minute was carried out 2000 times. Next, the test piece was immersed in a 0.2% aqueous basic fuchsine solution at 37° C. for 24 hours, and thereafter the test piece was taken out from the solution and washed with water. The test piece was dried with a dental air syringe, and its restored portion was divided into three portions lengthwise using a low-speed diamond cutter to give three slices per tooth. Fifteen slices were prepared from five molar teeth from human teeth in total. The evaluation of the penetration of the colorant was made in accordance with the evaluation method of Example 1.

Comparative Example 23

An adhesive composition in which methacrylic acid was removed from the adhesive composition used in Example 52 was prepared. Adhesive strength was determined in accordance with the testing method for adhesive strength of Example 52 using this adhesive composition. As a result, since the adhesive strength against bovine enamel was 17.2 MPa and the adhesive strength against bovine dentine was 14.3 MPa, adhesive strength is excellent. On the other hand, peripherical sealability was determined in accordance with the testing method for peripherical sealability of Example 52. However, since the score for the cavity margin of a tooth top side (enamel side) was 1.5 and the score for the cavity margin of a gingival side (dentin side) was 2.0, peripherical sealability is drastically deteriorated as compared to Example 52.

Example 53

An adhesive composition composed of 34 parts by weight of MDP, 2 parts by weight of 10HM, 40 parts by weight of HEMA, 5 parts by weight of Bis-GMA, 5 parts by weight of 9G, 5 parts by weight of UDMA, 5 parts by weight of distilled water, 3 parts by weight of TMDPO, 0.5 parts by weight of CQ, 0.5 parts by weight of DMAB and 0.05 parts by weight of BHT was prepared. Adhesive strength was determined in accordance with the testing method for adhesive strength of Example 52 using this adhesive composition. As a result, since the adhesive strength against bovine enamel was 16.5 MPa and the adhesive strength against bovine dentine was 14.1 MPa, adhesive strength is excellent. In addition, peripherical sealability was determined in accordance with the testing method for peripherical sealability of Example 52. As a result, since the score for the cavity margin of a tooth top side (enamel side) was 0.3 and the score for the cavity margin of a gingival side (dentin side) was 0.3, peripherical sealability is excellent.

Comparative Example 24

An adhesive composition in which 10HM was removed from the adhesive composition used in Example 53 was prepared. Adhesive strength was determined in accordance with the testing method for adhesive strength of Example 52 using this adhesive composition. As a result, since the adhesive strength against bovine enamel was 16.6 MPa and the adhesive strength against bovine dentine was 13.9 MPa, adhesive strength is excellent. On the other hand, peripherical sealability was determined in accordance with the testing method for peripherical sealability of Example 52. However, since the score for the cavity margin of a tooth top side (enamel side) was 1.5 and the score for the cavity margin of a gingival side (dentin side) was 2.0, peripherical sealability is clearly deteriorated as compared to Example 53.

Example 54

Adhesive strength was determined in accordance with the testing method for adhesive strength described below using the adhesive composition of Example 52. As a result, since the adhesive strength against bovine enamel was 21.5 MPa and the adhesive strength against bovine dentine was 14.1 MPa, adhesive strength is excellent. In addition, peripherical sealability was determined in accordance with the testing method for peripherical sealability described below. As a result, since the score for the cavity margin of a tooth top side (enamel side) was 0.1 and the score for the cavity margin of a gingival side (dentin side) was 0.6, peripherical sealability is excellent.

[Testing Method for Adhesive Strength]

Bovine front teeth were smoothly wet-grinded with #1000 silicon carbide paper (manufactured by Nippon Kenshi K.K.) to expose their enamel surfaces or dentin surfaces, and thereafter water on the surfaces was blown away with a dental air syringe. An adhesive tape having a thickness of about 150 $\mu$m with a hole opening having a diameter of 3 mm was pasted to the exposed enamel surfaces or dentin surfaces. A 40% aqueous phosphoric acid solution was applied to the hole portion, and washed with water after 15 seconds passed. Water was gently wiped off with absorbent cotton so that the tooth etched by phosphoric acid would not be dried. The adhesive composition obtained in Example 52 was immediately applied to the hole with a brush so that its thickness became about 100 $\mu$m. After 30 seconds, the resulting coat was photo-irradiated with a dental photoirradiator "LIGHTEL II" (manufactured by Gunma Ushio Denki K.K., trade name) for 30 seconds to cure the coat. Further, a commercially available photopolymerizable dental composite resin "Clearfil AP-X" (manufactured by Kuraray Co., Ltd., trade name) was mounted on the cured coat, and covered with a film made of EVAL (manufactured by Kuraray Co., Ltd., registered trademark). Thereafter, the slide glass was pressed over the film, and photo-irradiated for 40 seconds with the above-mentioned photoirradiator to cure the composite resin.

A stainless steel rod was bonded to the cured surface with a commercially available dental resin cement "Panavia 21" (manufactured by Kuraray Co., Ltd., trade name) to give a test piece. After 30 minutes, the test piece was immersed in water of 37° C. for 24 hours, and thereafter a thermal cycle comprising immersing the test piece in cold water of 4° C. for one minute and in hot water of 60° C. for one minute was carried out 2000 times. Thereafter, its adhesive strength was determined. A universal tester (manufactured by Instron) was used for the determination of the adhesive strength, and the tensile adhesive strength was determined under the conditions of a cross head speed of 2 mm/minute. The determination value for each adhesive strength was expressed as an average value of the determination values of 8 test pieces.

[Testing Method for Peripherical Sealability]

A cavity having a diameter of about 4 mm and a depth of about 3 mm was formed by using a dental air turbine so that the cervical line of the molar portion of a human evulsed tooth was positioned at the center. A 40% aqueous phosphoric acid solution was applied to the internal surface of the cavity, and washed with water after 15 seconds. Water was gently wiped off with absorbent cotton so that the tooth etched by phosphoric acid would not be dried. The adhesive composition obtained in Example 52 was immediately applied to the internal surface of the cavity so that its thickness became about 100 $\mu$m. After 30 seconds passed, the resulting coat was photo-irradiated for 30 seconds with a dental photoirradiator "LIGHTEL II" (manufactured by Gunma Ushio Denki K.K., trade name) to cure the coat. Further, a commercially available photopolymerizable dental composite resin "Clearfil AP-X" (manufactured by Kuraray Co., Ltd., trade name) was filled in the cavity, and photo-irradiated for 40 seconds with the above-mentioned photoirradiator to cure the composite resin. Subsequently, in order to prevent the penetration of the colorant from the tip of tooth root and the scissure at crown and the like, "Clearfil Megabond" (manufactured by Kuraray Co., Ltd., trade name) was applied to the portions other than the cavity restorative portion and its surroundings, and photo-irradiated for 30 seconds with the above-mentioned photoirradiator to cure the resin.

The resulting test piece was immersed in water at 37° C. for 24 hours, and thereafter a thermal cycle comprising immersing in cold water of 4° C. for one minute and in hot water of 60° C. for one minute was carried out 2000 times. Thereafter, the test piece was immersed in a 0.2% aqueous basic fuchsine solution at 37° C. for 24 hours, and thereafter the test piece was taken out from the solution and washed with water. The test piece was dried with a dental air syringe, and its restored portion was divided into three portions lengthwise using a low-speed diamond cutter to give three slices per tooth. Fifteen slices were prepared from five molar teeth from human teeth in total. The evaluation of the penetration of the colorant was made in accordance with the evaluation method of Example 1.

Comparative Example 25

Adhesive strength was determined in accordance with the testing method for adhesive strength of Example 54 using the adhesive composition of Comparative Example 23. As a result, since the adhesive strength against bovine enamel was 21.2 MPa and the adhesive strength against bovine dentine was 14.1 MPa, adhesive strength is excellent. On the other hand, peripherical sealability was determined in accordance with the testing method for peripherical sealability of Example 54. However, since the score for the cavity margin of a tooth top side (enamel side) was 0.8 and the score for the cavity margin of a gingival side (dentin side) was 2.4, peripherical sealability is clearly deteriorated as compared to Example 54.

Example 55

Adhesive strength was determined in accordance with the testing method for adhesive strength described below using the adhesive composition of Example 24. As a result, since the adhesive strength against bovine enamel was 18.6 MPa and the adhesive strength against bovine dentine was 9.6 MPa, adhesive strength is excellent. In addition, peripherical sealability was determined in accordance with the testing method for peripherical sealability described below. As a result, since the score for the cavity margin of a tooth top side (enamel side) was 0.2 and the score for the cavity margin of a gingival side (dentin side) was 0.4, peripherical sealability is also excellent.

[Testing Method for Adhesive Strength]

Bovine front teeth were smoothly wet-grinded with #1000 silicon carbide paper (manufactured by Nippon Kenshi K.K.) to expose their enamel surfaces or dentin surfaces, and thereafter water on the surfaces was blown away with a dental air syringe. An adhesive tape having a thickness of about 150 μm with a hole opening having a diameter of 4 mm was pasted to the exposed enamel surfaces or dentin surfaces, and the adhesive composition obtained in Example 24 was applied to the hole with a brush. The adhesive composition was allowed to stand for 30 seconds, and thereafter dried with an air syringe to a degree such that the adhesive composition had no fluidity.

A stainless steel rod was bonded to the applied surface of this adhesive composition with a commercially available dental resin cement "Panavia 21" (manufactured by Kuraray Co., Ltd., trade name) to give a test piece. After 30 minutes, the test piece was immersed in water of 37° C. for 24 hours, and thereafter a thermal cycle comprising immersing the test piece in cold water of 4° C. for one minute and in hot water of 60° C. for one minute was carried out 2000 times. Thereafter, its adhesive strength was determined. A universal tester (manufactured by Instron) was used for the determination of the adhesive strength, and the tensile adhesive strength was determined under the conditions of a cross head speed of 2 mm/minute. The determination value for each adhesive strength was expressed as an average value of the determination values of 8 test pieces.

[Testing Method for Peripherical Sealability]

A cavity having a diameter of about 4 mm and a depth of about 3 mm was formed by using a dental air turbine so that the cervical line of the molar portion of a human evulsed tooth was positioned at the center. An impression was prepared by using a commercially available dental rubbery elastic impression material "Exafine" (manufactured by K.K. G. C., trade name), and thereafter a cured product of a dental crown material "Estenia" (manufactured by Kuraray Co., Ltd., trade name) was prepared. The surface of the cured product was coated with a 40% aqueous phosphoric acid solution for 5 seconds, washed with water, and dried. Further, a dental porcelain bonding material "Clearfil Porcelain Bond" (manufactured by Kuraray Co., Ltd., trade name) was applied thereto, and dried with a dental air syringe.

The adhesive composition obtained in Example 24 was applied to the internal surface of the cavity, and the adhesive composition was allowed to stand for 30 seconds, and thereafter dried with the air syringe to a degree such that the adhesive composition had no fluidity. The cured product of Estenia (manufactured by Kuraray Co., Ltd., trade name) was glued with a dental resin cement "Panavia 21" (manufactured by Kuraray Co., Ltd., trade name), and thereafter an excess paste was removed. After 5 minutes passed from gluing, "Oxyguard II" (manufactured by Kuraray Co., Ltd., trade name) was applied to the peripherical portion to cure the surface of the resin cement, and after 10 minutes passed, Oxyguard II was removed with a water gun. Subsequently, in order to prevent the penetration of the colorant from the tip of tooth root and the scissure at crown and the like, "Clearfil Megabond" (manufactured by Kuraray Co., Ltd., trade name) was applied to the portions other than the cavity restorative portion and its surroundings, and photo-irradiated for 30 seconds with the above-mentioned photoirradiator to cure the resin.

The resulting test piece was immersed in water at 37° C. for 24 hours, and thereafter a thermal cycle comprising immersing in cold water of 4° C. for one minute and in hot water of 60° C. for one minute was carried out 2000 times. Thereafter, the test piece was immersed in a 0.2% aqueous basic fuchsine solution at 37° C. for 24 hours, and thereafter the test piece was taken out from the solution and washed with water. The test piece was dried with a dental air syringe, and its restored portion was divided into three portions lengthwise using a low-speed diamond cutter to give three slices per tooth. Fifteen slices were prepared from five molar teeth from human teeth in total. The evaluation of the penetration of the colorant was made in accordance with the evaluation method of Example 1.

Comparative Example 26

Adhesive strength was determined in accordance with the testing method for adhesive strength of Example 55 using the adhesive composition of Comparative Example 16. As a result, since the adhesive strength against bovine enamel was 18.3 MPa and the adhesive strength against bovine dentine was 9.3 MPa, adhesive strength is excellent. On the other hand, peripherical sealability was determined in accordance with the testing method for peripherical sealability of Example 55. However, since the score for the cavity margin of a tooth top side (enamel side) was 1.7 and the score for the cavity margin of a gingival side (dentin side) was 1.9, peripherical sealability is deteriorated as compared to Example 55.

Since the adhesive composition of the present invention strongly bonds to a tooth and shows excellent peripherical sealability, it can be suitably used for bonding a hard tissue with a resin material in the medical field and the dental field.

In addition, the adhesive composition of the present invention can improve peripherical sealability especially for a tooth, so that the penetration of the bacterial caries into the bonding portion can be suppressed, whereby regeneration of caries can be prevented. Therefore, the adhesive composition is highly valuable in the contribution to dental therapy.

What is claimed is:

1. An adhesive composition comprising:

(a) at least one acidic group-containing polymerizable monomer selected from the group consisting of a phosphate group-containing polymerizable monomer, a pyrophosphate group-containing polymerizable monomer, a thiophosphate group-containing polymerizable monomer and a sulfonate group-containing polymerizable monomer;

(b) a polymerizable monomer represented by the general formula (I):

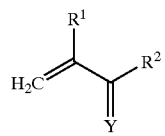

(I)

wherein $R^1$ is hydrogen atom or methyl group; $R^2$ is a halogen atom, hydroxyl group, mercapto group or —O—$R^3$—OH group, wherein $R^3$ is an alkylene group having 6 to 25 carbon atoms; and Y is oxygen atom or sulfur atom; and (c) at least one hydrophilic polymerizable monomer selected from the group consisting of hydroxyalkyl (meth)acrylates having an alkylene group of 2 or 3 carbon atoms; di-, tri- or tetra-hydroxy (meth)acrylates having an alkylene group of 3 to 5 carbon atoms; mono-, di- or tri-hydroxy di(meth)acrylates having an alkylene group of 3 to 5 carbon atoms; (meth) acryloyloxyalkyl trialkylammonium halides having an alkylene group of 2 to 20 carbon atoms; (meth) acrylamides; mono- or di(hydroxyalkyl) (meth) acrylates having 2 or 3 carbon atoms; and polyethylene glycol di(meth)acrylates having at least 9 oxyethylene groups, wherein the weight ratio of the polymerizable monomer (b)/acidic group-containing polymerizable monomer (a) is 0.001 to 0.5.

2. The adhesive composition according to claim 1, wherein the acidic group-containing polymerizable monomer (a) is a phosphate group-containing polymerizable monomer.

3. The adhesive composition according to claim 2, wherein the phosphate group-containing polymerizable monomer is represented by the general formula (II):

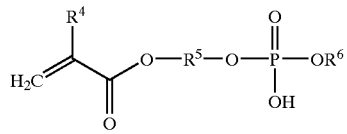

(II)

wherein $R^4$ is hydrogen atom or methyl group; $R^5$ is an alkylene group having 6 to 25 carbon atoms; and $R^6$ is hydrogen atom, an alkyl group or phenyl group.

4. The adhesive composition according to claim 1, wherein the polymerizable monomer (b) is a hydroxyl group-containing polymerizable monomer represented by the general formula (III):

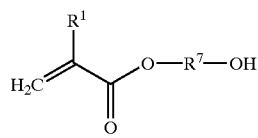

(III)

wherein $R^1$ is hydrogen atom or methyl group; and $R^7$ is an alkylene group having 6 to 25 carbon atoms.

5. The adhesive composition according to claim 1, wherein the acidic group containing polymerizable monomer (a) is a phosphate group-containing polymerizable monomer represented by the general formula (II):

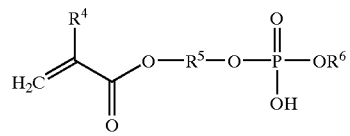

(II)

wherein $R^4$ is hydrogen atom or methyl group; $R^5$ is an alkylene group having 6 to 25 carbon atoms; and $R^6$ is hydrogen atom, an alkyl group or phenyl group, and the polymerizable monomer (b) is a hydroxyl group-containing polymerizable monomer represented by the general formula (III):

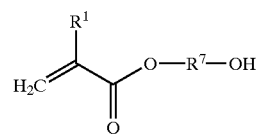

(III)

wherein $R^1$ is hydrogen atom or methyl group; and $R^7$ is an alkylene group having 6 to 25 carbon atoms, and $R^5$ is identical to $R^7$.

6. The adhesive composition according to claim 1, wherein the polymerizable monomer (b) comprises a hydroxyl group-containing polymerizable monomer represented by the general formula (III):

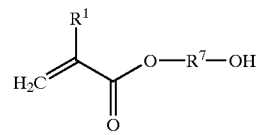

(III)

wherein $R^1$ is hydrogen atom or methyl group; and $R^7$ is an alkylene group having 6 to 25 carbon atoms, and a polymerizable monomer represented by the general formula (IV):

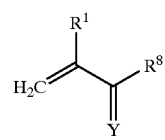

(IV)

wherein $R^1$ is hydrogen atom or methyl group; $R^8$ is a halogen atom, hydroxyl group or mercapto group; and Y is oxygen atom or sulfur atom.

7. The adhesive composition according to claim 1, further comprising (d) 10 water.

8. The adhesive composition according to claim 1, further comprising (e) a polymerization initiator.

9. The adhesive composition according to claim 1, wherein the acidic group-containing polymerizable monomer (a) is a pyrophosphate group-containing polymerizable monomer.

10. The adhesive composition according to claim 1, wherein the acidic group-containing polymerizable monomer (a) is a thiophosphate group-containing polymerizable monomer.

11. The adhesive composition according to claim 1, wherein the acidic group-containing polymerizable monomer (a) is a sulfonate group-containing polymerizable monomer.

12. The adhesive composition according to claim 6, wherein a weight ratio of the monomer of formula (III) to the monomer of formula (IV) is 0.005 to 200.

13. The adhesive composition according to claim 6, wherein a weight ratio of the monomer of formula (III) to the monomer of formula (IV) is 0.05 to 20.

14. The adhesive composition according to claim 1, wherein the weight ratio of the polymerizable monomer (b)/acidic group-containing polymerizable monomer (a) is 0.005 to 0.3.

15. The adhesive composition according to claim 1, wherein the weight ratio of the polymerizable monomer (b)/acidic group-containing polymerizable monomer (a) is 0.01 to 0.1.

16. The adhesive composition according to claim 1, wherein the hydrophilic polymerizable monomer (c) has a solubility of at least 10%.

17. The adhesive composition according to claim 1, wherein the amount of water is 0.1 to 80% by weight.

18. A coating, comprising:
the adhesive composition according to claim 1.

19. The coating according to claim 18, having a thickness of at least 10 $\mu$m.

20. The adhesive composition according to claim 1, which is cured.

* * * * *